US000001360H

United States Statutory Invention Registration [19]

[11] Reg. Number: H1360

Grove et al.

[43] Published: Oct. 4, 1994

[54] LIGHTWEIGHT PROTECTIVE GAS MASK AND HOOD

[75] Inventors: Corey M. Grove, Red Lion, Pa.; John A. Scavnicky, Joppa; Albert N. Tardiff, Jr., Germantown, both of Md.

[73] Assignee: The United States of America, as represented by the Secretary of the Army, Washington, D.C.

[21] Appl. No.: 986,236

[22] Filed: Dec. 7, 1992

Related U.S. Application Data

[63] Continuation of Ser. No. 902,261, Jun. 22, 1992, which is a continuation of Ser. No. 691,243, Apr. 24, 1991, abandoned.

[51] Int. Cl.[5] ..... A62B 7/10; A62B 17/00

[52] U.S. Cl. ..... 128/201.25; 128/201.23; 128/205.29

[58] Field of Search ..... 128/201.19, 201.22–201.27, 128/205.29

[56] References Cited

U.S. PATENT DOCUMENTS

| | | | |
|---|---|---|---|
| H863 | 1/1991 | Kwledorowicz | 128/201.25 |
| 2,365,779 | 12/1944 | Schwab | 128/201.25 |
| 2,529,106 | 11/1950 | Schauwecker et al. | 128/201.25 |
| 3,911,914 | 10/1975 | Johansson | 128/201.23 |
| 4,019,508 | 4/1977 | Der Estephanian et al. | 128/201.23 |
| 4,116,237 | 9/1978 | Birch | 128/201.23 |
| 4,466,432 | 8/1984 | Wise | 128/201.25 |
| 4,627,431 | 12/1986 | Werjefelt | 128/201.25 |
| 4,667,976 | 7/1987 | Fujinuma et al. | 128/201.25 |
| 4,676,236 | 6/1987 | Piorkowski et al. | 128/201.25 |
| 4,836,197 | 6/1989 | Rohling et al. | 128/201.23 |
| 4,901,370 | 2/1990 | Suda | 128/205.29 |

FOREIGN PATENT DOCUMENTS

| | | | |
|---|---|---|---|
| 0339487 | 11/1989 | European Pat. Off. | 128/205.29 |
| 2191099 | 12/1987 | United Kingdom | 128/201.23 |

*Primary Examiner*—David H. Brown
*Attorney, Agent, or Firm*—Anthony T. Lane; Edward Goldberg; Michael Sachs

[57] ABSTRACT

A protective mask with a hood having a face piece, a head piece, and a bib formed from an elastic impervious material. A foam rubber seal, mounted on the inside surface of the hood, is located on the periphery of the face piece. An pair of eye pieces are mounted on the face piece for permitting exterior vision from inside the hood. A plurality of filter cells with flexible charcoal filters are mounted on the bib. Air ducts extend from an air reservoir fed by the cells to the face piece to permit filtered air to be drawn into the face piece. A flapper valve is mounted on the face piece to permit air to be exhausted from the mask.

3 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

21
23
25
42
22
38
39
32
33
36
37
35
64
64
63
24
61
71
56
74
79
62
78
72
57
28
58
77
56
73
76
78
75
27

LIGHTWEIGHT PROTECTIVE GAS MASK AND HOOD

GOVERNMENT INTEREST

The invention described herein may be manufactured, used and licensed by or for the Government for Governmental purposes without the payment to us of any royalties thereon.

This application is a continuation of application Ser. No. 902,261, filed Jun. 22, 1992, which is a continuation of application Ser. No. 691,243, filed Apr. 24, 1991, now abandoned.

BACKGROUND OF THE INVENTION

1. Field of the Invention

The present invention relates to lightweight gas masks for use in protecting personnel from exposure to chemical and biological agents. More specifically, it relates to protective head and shoulder covers with chemical air filters that protect lungs, face, head and upper body from contact with toxic chemical and biological agents.

2. Description of the Prior Art

Protective masks, often called gas masks, have been widely used by the military, industry and emergency civil organizations to protect civilian and military personnel from exposure to a variety of toxic airborne agents. Since the advent of gas warfare in World War I, the military has developed a variety of gas masks. Some of the most critical problems confronting developers of such masks have been associated with the following mask features: weight, size, stowage, fit, comfort, optical compatibility and breathing resistance. Although such prior art devices have generally served the purpose, they have not proved entirely satisfactory under all conditions of service.

More specifically, the Army's most current protective masks include the M40, intended for use by the infantry, and the M42, intended for use by tankers. The M40 face piece, protective hood, filter canister and carrier weigh approximately 3.8 pounds and accumulate a packaged space of approximately nine inches by eleven inches by four and one-half inches. The M40 mask has a flexible face piece so that it may be folded for storage in the carrier along with the hood, a filter, a winterization kit, etc. The loaded carrier is carried by the soldier with a sling shoulder strap and a waist strap. The face piece, made from silicone, has a peripheral seal designed to provide a comfortable seal on the user's face. Although the eye relief of the M40 is closer than that of a previous Army mask (M17), it still has problems in coupling with certain optical sighting devices. Also, to accommodate left and right handed firing, the M40 must exchange its filter canister from one side to the other side of its face piece. Although a generally acceptable breathing resistance is achieved in the M40, many users still complain of its high breathing resistance especially at high work rates.

The M40 series of masks was primarily designed for the military, however similarly constructed masks as the M40 have also found important civilian uses. For instance, protective masks are routinely used by agricultural personnel during periods of herbicide and pesticide spraying. Other civilian users of protective masks include workers in the chemical industry, biological researchers and fire fighters.

The primary thrust in current U.S. Army plans for the future battlefield is to lighten the soldier's load. However, some bulky protective gear, such as the current gas masks, must be carried by the soldier whether there is an immediate need for it or not. The size and weight of the M40 mask precludes its use in many special "light forces" applications. The M40, even though it can be rolled up in the carrier, occupies too much space for even normal combat operations, in the opinion of many combat soldiers.

Further, many users of gas masks often find them uncomfortable to wear. The suspension system of the M40 series includes thick strapping and metal buckles which cause hot spots on the wearer's head. Also, the M40 hood is not conformable and is bulky which, under many circumstances, causes movement to be awkward. The combined weight of the M40 mask, hood and canister can cause neck strain when it is worn for an extended period. The relatively heavy C2 filter canister bounces when the user moves quickly, often causing the mask to jerk the wearer's head.

Optical compatibility is another problem users often encounter with conventional gas masks. The eye relief of the M40 mask is about 45 millimeters. The recommended eye relief for proper use of most optical equipment is typically 25 millimeters. As such, many sighting devices within the Army's inventory either cannot be used with the M40 mask or the user's field of view is significantly reduced. Also, when the filter canister is mounted on the face piece, it can often pose optical compatibility problems with many weapon systems, fire fighting equipment, rescue apparatus and the like.

Still further, users of protective masks often experience physiological problems associated with high inhalation and exhalation resistances caused by current flapper-valve and canister-filter combinations. For example, the C2 canister, used in the M40 series of masks, produces 45 millimeters of H2O resistance when measured at a flow rate of 85 liters per minute. Many users find that resistance to by unduly high, particularly in stressful situations.

Consequently, those concerned with the development of protective masks have long recognized the need for substantial improvements in mask design. The present invention fulfills this need.

SUMMARY OF THE INVENTION

The general purpose of this invention is to provide a protective mask which embraces all the advantages of similarly employed devices and possesses none of the aforedescribed disadvantages. To attain this, the present invention contemplates a unique integrated face piece, hood and filter arrangement whereby the weight, bulk, breathing resistance and stowage size are minimized, the comfort and optical compatibility are maximized, and the fit is made more conformable. While conventional Army masks normally require a special carrier that must be carried in addition to the usual backpack, the present mask is reduced in size to allow transport as part of the backpack, in a garment pocket or in a purse.

More specifically, the mask of the present invention includes a hood having a face piece, a head piece, and a bib formed from an elastic impervious material. A seal, mounted on the inside surface of the hood, is located on the periphery of the face piece. An optical means is mounted on the face piece for permitting exterior vision from inside the hood. A filter means that includes a flexible filter mounted on the bib and an air duct that extends from the bib to the face piece permits filtered air to be drawn into the face piece via the filter and the duct. A one-way valve is mounted on the face piece to permit air to be exhausted from the face piece.

It is, therefore, an object of the present invention to provide a protective mask of reduced weight and bulk.

Another object is the provision of a mask fabricated from materials that permit flexibility and stretch.

A further object of the invention is to provide a mask system that can be folded or rolled up into a small package for compact, safe stowage.

Still another object is the provision of a mask wherein the seal and face piece are made of highly conformable material for maximum comfort.

Yet another object of the present invention is the provision of a protective mask having a semi-flexible lens system that is located closer to the user's eye for improved vision and optical coupling with optical sighting devices.

A still further object is to provide a mask having significantly reduced breathing resistance.

The exact nature of this invention, as well as other objects and advantages thereof, will be readily apparent from consideration of the following specification relating to the annexed drawings.

DETAILED DESCRIPTION OF THE PREFERRED EMBODIMENT

Figure 1:
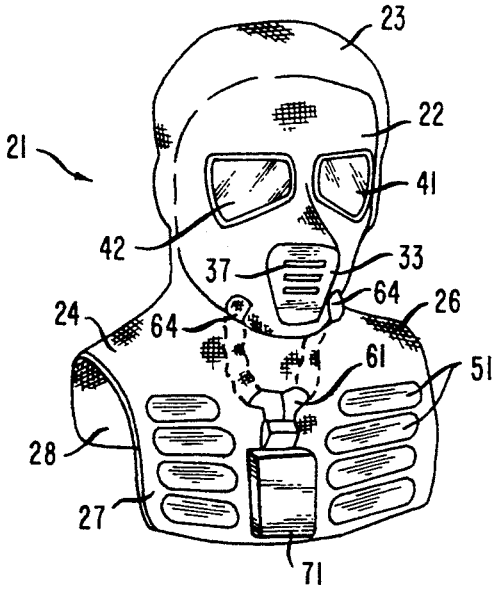
FIG. 1 is a pictorial view of the preferred embodiment.
Figure 6A:
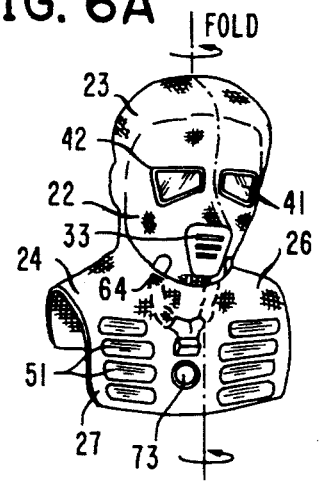
FIGS. 6A–6F are pictorial views of the preferred embodiment in various folded positions to illustrate a preferred storage procedure.
Figure 6B:
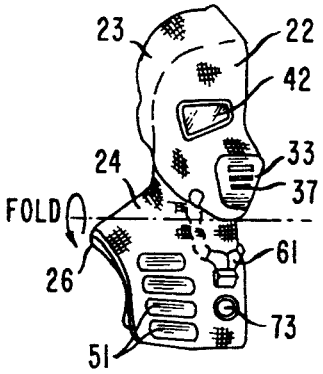
Figure 6C:
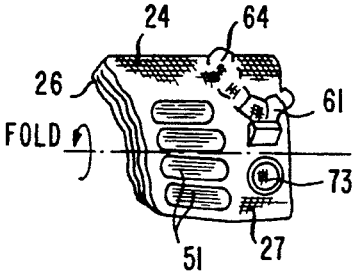
Figure 6D:
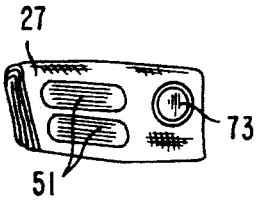
Figure 6E:
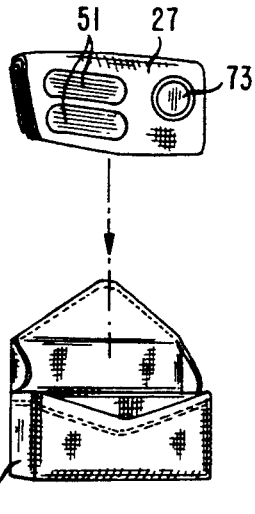
Figure 6F:
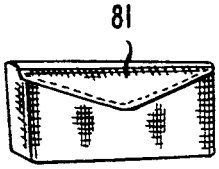
Figure 2:
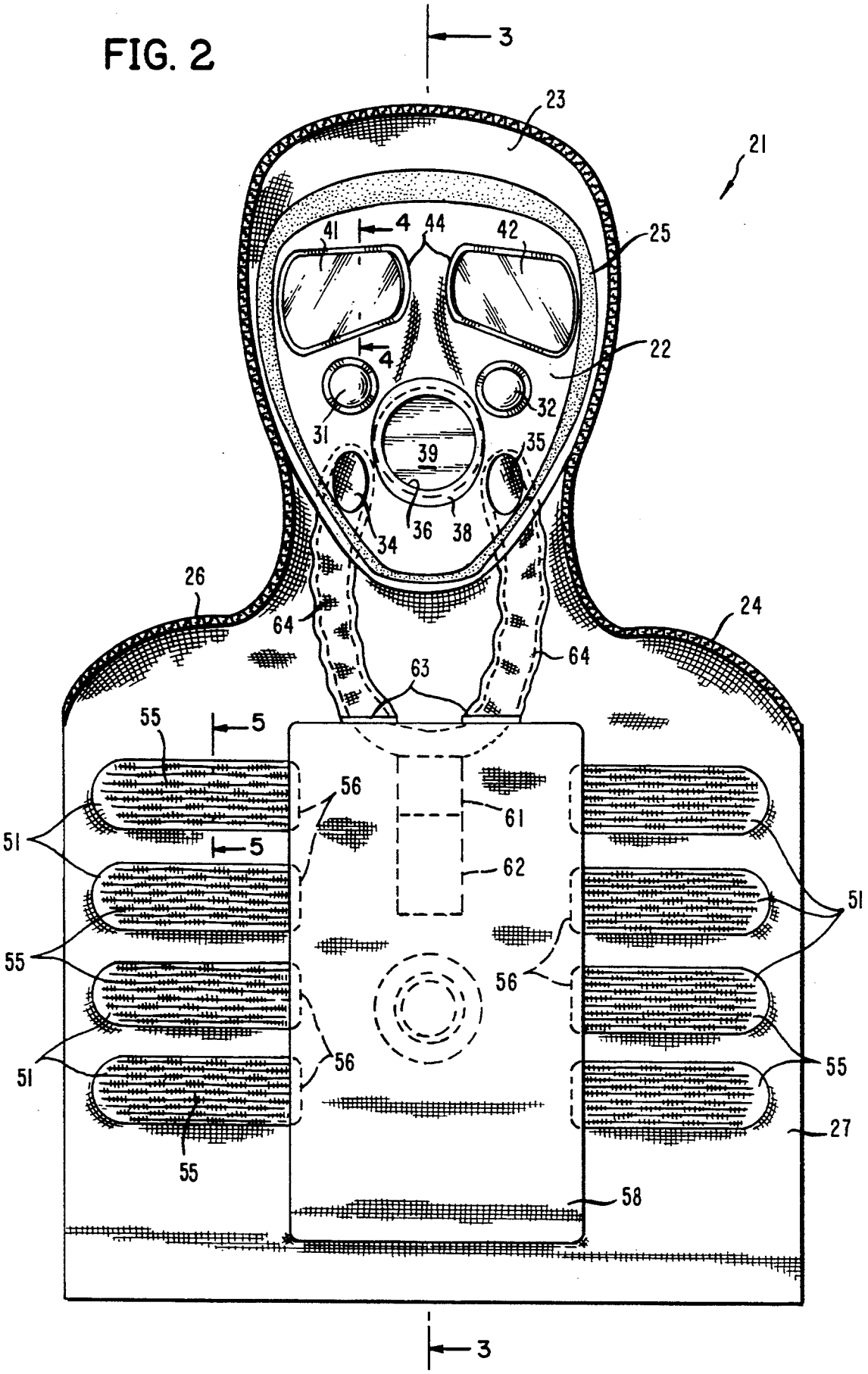
FIG. 2 is a cross section in elevation of the preferred embodiment
Figure 3:
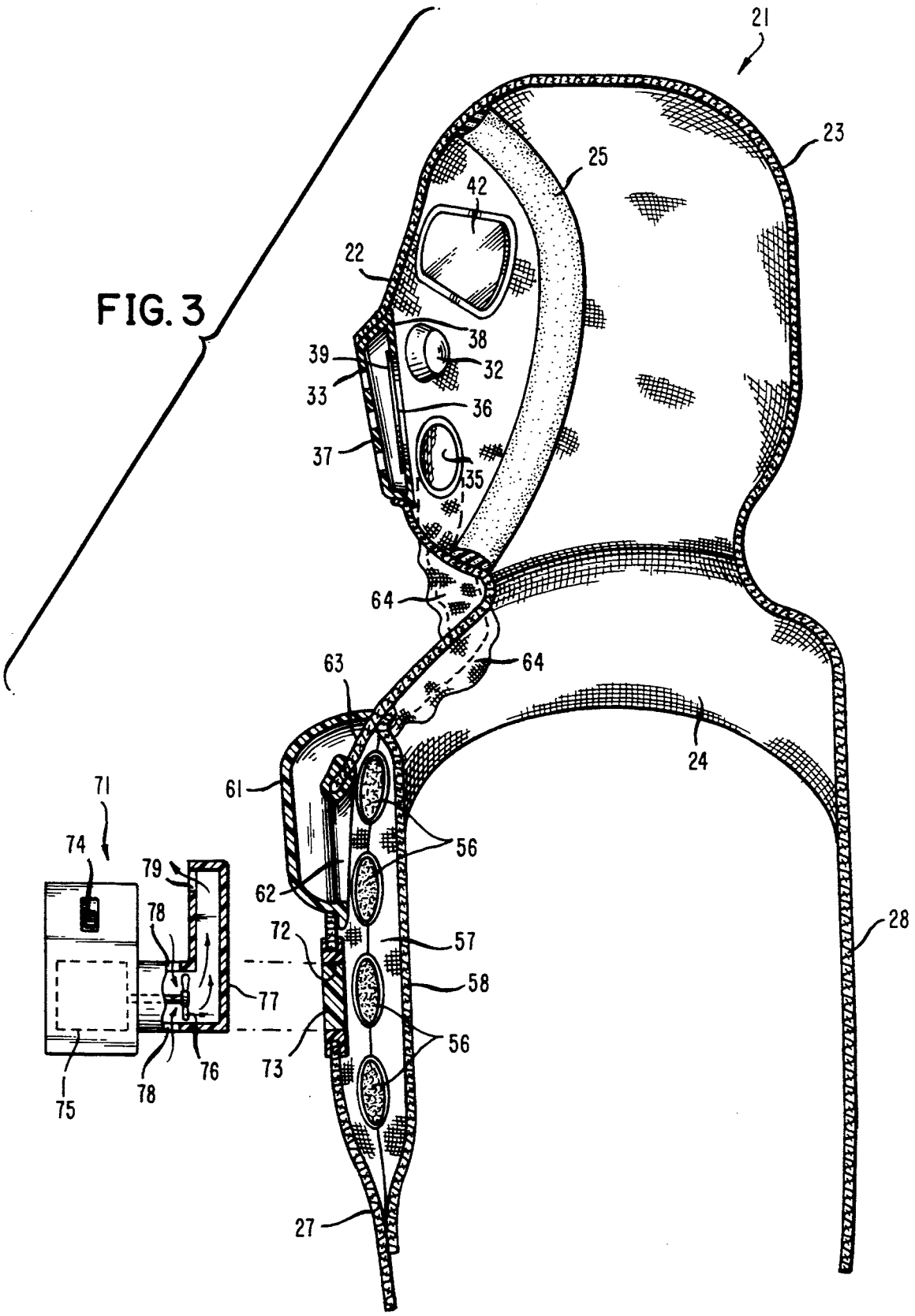
FIG. 3 is a cross section of the preferred embodiment taken on the line 3—3 of FIG. 2 and looking in the direction of the arrows.

Referring now to the drawings, there is shown a hooded mask 21 having a face piece 22 and a head piece 23 that are separated by a peripheral face seal 25. A right shoulder piece 24, a left shoulder piece 26, a front bib 27 and a rear bib 28 extend from the head piece 23. Face piece 22, head piece 23, shoulder pieces 24, 26 and bibs 27, 28 may be made from a unitary sheet of low profile, elastic material, such as a lycra/spandex blend laminated with a fluorinated thermoplastic elastomer to maximize stretch and chemical resistance.

The face seal 25, laminated to the inside surface of the mask 21, defines the boundary of the face piece 22. Seal 25 is preferably made of foam rubber that is shaped to make sealing contact across the forehead, along the cheeks and temples, and under the chin of the wearer. A suitable foam rubber material includes neoprene.

Also laminated to the inside surface of mask 21 are a pair of raised foam rubber spacers 31, 32 that are located on the face piece 22. The spacers 31, 32 make gentle contact with the user's face, thereby forming a nose-cup region by positioning the face piece 22 a slight distance from the user's nose and mouth.

The nose-cup region includes a pair of inlet ports 34, 35 and a rigid outlet valve cover 33. Cover 33, preferably made of plastic, includes an outer perforated grill 37 that covers an inner wall 38 having an outlet opening 36. A flapper valve 39, fixed at its upper edge to the wall 38, covers the opening 36 to permit exhaled air to be exhausted in one direction while preventing gases from entering the mask 21 in the opposite direction.

Figure 4:
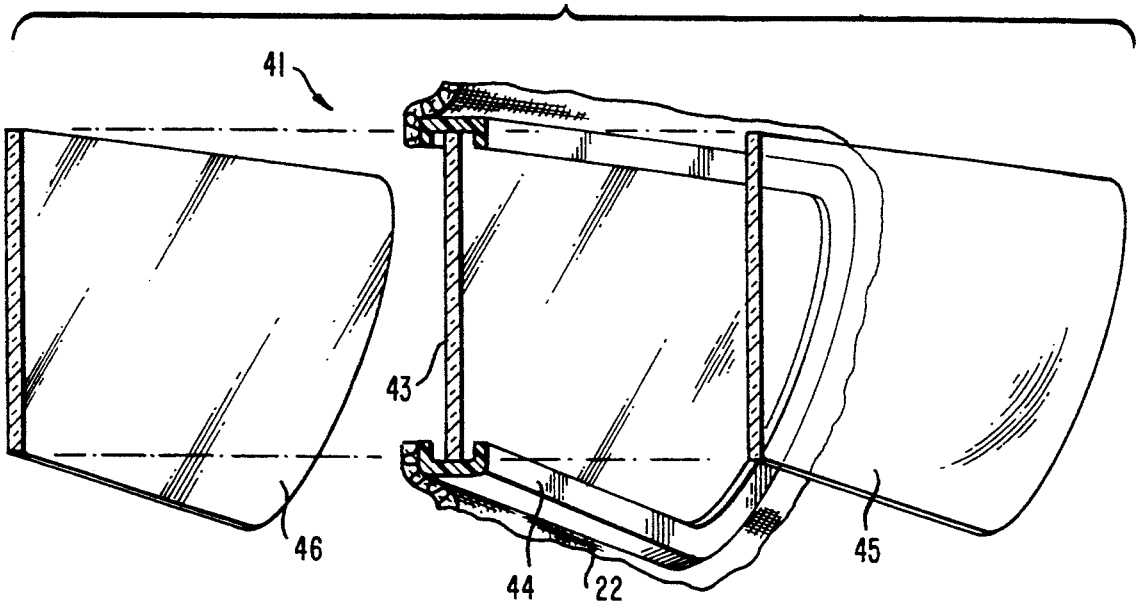
FIG. 4 is a pictorial view of a detail of the preferred embodiment shown in a cross section taken on the line 4—4 of FIG. 2 and looking in the direction of the arrows.

Also located on the face piece 22 is an optical system composed of a pair of eye pieces 41, 42, shown in detail in FIG. 4. Eye pieces 41, 42 each includes a conventional primary lens 43, made of polycarbonate or other suitable semi-flexible material. A flexible outer frame 44 is fixed to the periphery of lens 43 and to the face piece 22. Frame 44 includes a pair of snap-in grooves for removably receiving insert lens 45, 46. Lens 45 may be designed to provide individualized optical correction for the user while lens 46 may provide special protection from laser, thermal or ultraviolet radiation.

Figure 5:
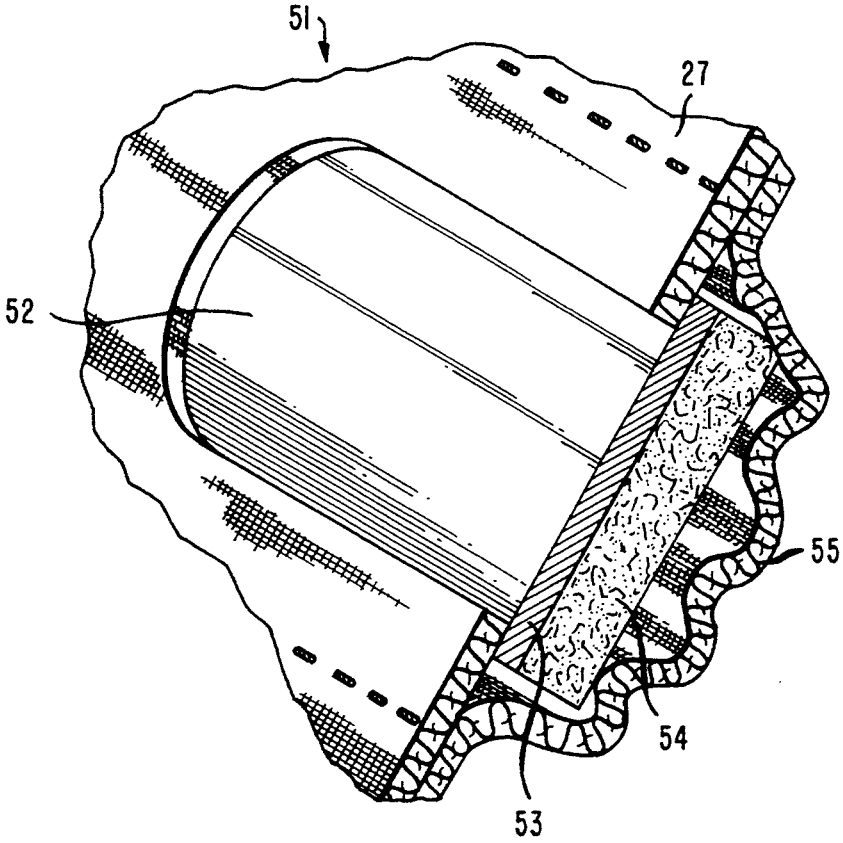
FIG. 5 is a pictorial view of a detail of the preferred embodiment shown in a cross section taken on the line 5—5 of FIG. 2 and looking in the direction of the arrows.

The front bib 27 supports a filtration system that provides filtered air to the face piece 22 via the inlet ports 34, 35. A plurality of filter cells 51 (eight are shown for illustration purposes) are mounted on either side of the front bib 27. Each cell 51 (FIG. 5) includes an air-inlet opening 52 covered with an aerosol particulate filter 53, such as conventional filter paper or other suitable material. The filter material usod to form filter 53 may also be pleated to reduce breathing resistance by providing a larger air-input surface area for the cells 51.

The cells 51 also contain a conventional flexible, carbon-loaded fabric 54 which is enclosed by a backing 55 made from a semi-rigid corrugated material, such as Triloc, to provide air channels for the filtered air. The ends of cells 51 have air openings 56 that are located inside an air reservoir 57 defined by a backing sheet 58 that is sealed along its edges to the inside surface of front bib 27. To provide greater volume in the reservoir 57 and greater rigidity, the backing sheet 58 may be made of corrugated material of the type used for the fabric 55.

A ducting system is provided for the distribution of air from the reservoir 57 to the face piece 22. The ducting system includes a semi-rigid tubular yoke 61, having an air inlet port 62, that is fixed to an opening in the bib 27 such that port 62 communicates with reservoir 57. Yokke 61, preferably made of rigid plastic, includes left and right outlet ports 63 that communicate with left and right ducts 64, which also may be fabricated from a semi-rigid corrugated material such as Triloc. Ducts 64 are fixed to the inside surface of the upper region of the front bib 27 and to the outer surface of face piece 22. The ducts 64 communicate with the inlet ports 34, 35.

An optional portable blower system 71 is attachable to the front bib 27 via an opening 72 which normally contains a removable plug 73. Blower system 71 includes an on-off switch 74 that controls an electrical system 75 having a motor for driving a fan 76 that is housed in an L-shaped tube 77. Input ports 78 and an output port 79 are located in tube 77 on either side of the fan 76.

With the plug 73 removed, the user installs the blower system 71 by sliding the tube 77 into the opening 72 until the housing of the blower system 71 abuts the front surface of the bib 27. The L-shaped tube 77 is sized to tightly seal the opening 72. In this position, the input ports 78 will be located inside the reservoir 57 and the output port 79 will be located directly in front of the port 62. When the switch 74 is turned on, the fan 76 will draw air through ports 78 and direct a stream of forced air from port 79 into port 62. As such, the blower system 71 can be selectively used to provide cooling when in a hot environment and/or to assist in breathing by providing a continuous airstream to the wearer.

Because the mask 21 is primarily composed of flexible materials, it can be easily folded into a relatively small configuration for pocket-size transport, as depicted in FIGS. 6A–6F. This feature also allows for the mask 21 to be heat sealed into a small vacuum pack 81 (FIGS. 6E, 6F) for protection. The pack 81 eliminates the need for the conventional bulky carriers that usually accompany standard masks.

The flexible fabric 54, impregnated with activated charcoal, allows for air distribution over a large cross-section to minimize breathing resistance. The ducting system allows for distribution and collection of the incoming air to a central location, reservoir 57, before distribution to the face piece 22. This air distribution provides for balanced air flow across the filter fabric 54 to minimize channeling. The flapper valve 39 will present low resistance to exhaled air.

The flexibility and elasticity of the head piece 23, the seal 25 and related structures provides a secure and comfortable fit while eliminating the hot-spot problems associated with the heavy strap and buckle suspensions found in conventional masks. The optical system, which includes the eye pieces 41, 42 with their low-profile, semi-flexible lenses 43, 45, 46 mounted in the flexible frame 44, will easily conform to the facial structure of the individual. As such, the optical system, along with the stretchable fabric of face piece 22, will allow for easy adjustment and positioning of the eye pieces 41, 42 to optimize optical compatibility.

Obviously, many modifications, variations and applications of the present invention are possible in the light of the above teachings. The foregoing disclosure and drawings are merely illustrative of the principle of this invention and are not to be interpreted in a limiting sense. It is to be understood that the invention should not be limited to the exact details of construction shown and described because obvious modifications will occur to a person skilled in the art.

What is claimed is:

1. A protective mask comprising:

a hood having a face piece, a head piece and a bib formed from an elastic impervious material, wherein a spacer means is fixed to the inside surface of said face piece for forming a nose cup, and wherein said bib has two shoulder pieces and front and back portions;

a seal mounted on the inside surface of said hood located on the periphery of said face piece;

optical means mounted on said face piece for permitting exterior vision from inside said hood wherein said optical means includes an eye piece having a semi-flexible frame with a fixed lens and at least one removable lens;

filter means, including a flexible filter mounted on said bib and an air duct extending from said face piece, for permitting filtered air to be drawn into said face piece via said filter and said duct; said filter means further including an air reservoir means in communication with said filter and said air duct for containing a volume of filtered air, said reservoir means including a flexible member attached to said bib to form a chamber that is in communication with said filter and said duct; said filter including a plurality of cells mounted on said bib, each said cell having an air output opening in communication with said chamber;

a one-way valve means mounted on said face piece for permitting air to be exhausted from inside said face piece, said valve including a perforated valve cover mounted on said face piece; and a blower means removably mounted on said bib and including a fan positioned in said chamber to force air into said duct.

2. The mask of claim 1 wherein each said cell has an air input opening located on the outside surface of said bib and wherein a flexible fabric impregnated with activated charcoal is mounted between said input opening and said output opening.

3. The mask of claim 2 wherein a flexible layer of aerosol particulate filter material extends across each said input opening.

* * * * *